Aug. 1, 1967    L. MONRAD-KROHN    3,334,298
WAVEFORM DETECTOR USING AMPLITUDE COMPARISON
OF TIME-SPACED SAMPLES OF THE WAVEFORM
Filed Dec. 26, 1963                    3 Sheets-Sheet 1

INVENTOR.
LARS MONRAD-KROHN
BY
*Morton M. Foster*
ATTORNEY

INVENTOR:
LARS MONRAD-KROHN
BY,
ATTORNEY

INVENTOR:
LARS MONRAD-KROHN

BY,

ATTORNEY

United States Patent Office

3,334,298
Patented Aug. 1, 1967

---

3,334,298
WAVEFORM DETECTOR USING AMPLITUDE
COMPARISON OF TIME-SPACE SAMPLES OF
THE WAVEFORM
Lars Monrad-Krohn, Cambridge, Mass., assignor, by mesne assignments, to the United States of America as represented by the United States Atomic Energy Commission
Filed Dec. 26, 1963, Ser. No. 334,085
4 Claims. (Cl. 324—77)

This invention relates to an electrical waveform detector and more particularly to apparatus employing amplitude comparison and digital logic to produce an output signal only when the electrical input waveform is of a prescribed form.

There are many instances in electrical systems where the presence of a signal having a prescribed amplitude-time relationship is to be selected from a number of undesired waveforms. Where the desired waveform is coincident in time with undesired waveforms the "matched filter" for the waveform of the desired signal is very effectively used in determining its presence. There are situations however where the desired waveform is separated in time from undesirable waveforms which may be of quite similar shape. In this case the matched filter will produce an output for the desired waveform which is not significantly different from the output resulting from the similar but undesired input waveforms. The problem becomes even more acute where the amplitude of the desired and undesired waveforms are not equal and where they may fluctuate with time.

It is an object of this invention to provide a detector which is responsive to the desired waveform while rejecting waveforms that may be close to the same shape.

It is a further object of this invention to provide a detector which is responsive to a particular waveform and whose response is independent of the amplitude of the desired waveform over a considerable range.

The waveform detector of this invention is a form of matched filter of the delay line type which incorporates simple, logical decisions instead of the conventional linear summation. Briefly, the waveform detector converts the time variable signal waveform appearing at its input into a space variable sampled at specific points with a fixed time relationship between sampling points. This transformation from time variable to space variable is achieved with delay lines. The signals appearing at the sample points are compared to each other in logical circuits which characterize the signal as a desired or an undesired waveform. The device is thus a very general technique of making a kind of "matched filter" or detector for a specific waveform. The number of sampling points and the complexity of the digital and analog decision circuits which form the logic of the device determine the waveform selectivity of the detector.

Other features of the invention reside in certain details of construction and modes of operation that will become apparent from the following description of embodiments and certain alternatives thereto, having reference to the appended drawings illustrating the same.

Figure 1:
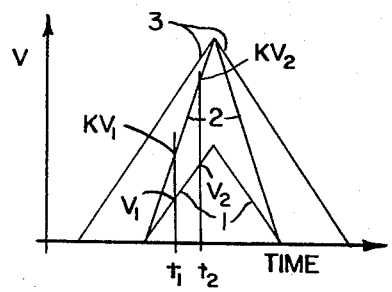
FIG. 1 illustrates waveforms which have characteristics which the detector of this invention evaluates.

Since the invention is concerned with a waveform detector, it is appropriate to define what is meant by waveform. Referring to FIG. 1, waveforms 1 and 2 are considered to have the same waveform. The basis for this statement is that for any time $t$ the amplitude of waveforms 1 and 2 are related by a constant ratio, $k$. If the apparatus of the present invention is designed to detect waveform 1 it will also without modification or adjustment detect related waveforms such as waveform 2. In contrast, waveform 3 which is a magnified version of waveform 1 is not by this definition the same waveform, and therefore not detected by the apparatus. It is observed that the voltage amplitudes of waveform 1 at times $t_2$, $t_1$ are $V_2$, $V_1$, respectively, with a ratio, $V_2/V_1$, whereas the voltage amplitudes of related waveform 2 at these same times are $kV_2$, $kV_1$, whose ratio also is $V_2/V_1$. It follows that a waveform detector which is sensitive to the ratios of sampled voltages will then be insensitive to their absolute values.

A detector capable of ascertaining the ratio of two voltages can be duplicated to concurrently measure the ratio of a different two voltages without theoretical limit. Since any waveform can be approximated by sampling its voltage amplitudes at a number of different points distributed in time, it follows that apparatus for determining the ratio relationship between these points is able to determine with a certainty dependent on the number of samples whether the sampled waveform satisfies the criteria established in the apparatus for the ratios of a desired waveform.

Figure 2:
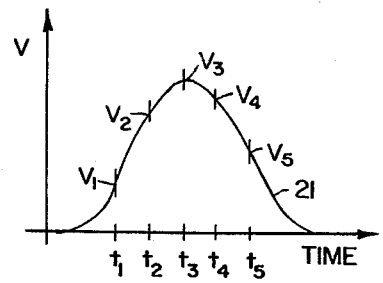
FIG. 2 illustrates a typical waveform which can be detected.

As an example, consider the waveform 21 of FIG. 2 to be the waveform which the detector is to select. The amplitudes $V_1$ through $V_5$ of waveform 21 at sampling points $t_1$ throught $t_5$ are considered to distinguish waveform 21 from other waveforms which are presented as inputs to the detector. The ratios of these voltages can be caused to form a set wherein every voltage is used at least once. For instance, $V_2/V_1$, $V_3/V_2$, $V_4/V_3$, $V_5/V_4$ are a set which completely charactrizes waveform 21 and all its related waveforms. Apparatus which is capable of determining that an input waveform satisfies all these ratios simultaneously has therefore determined that the input waveform is waveform 21, a related waveform, or at the minimum a waveform which at times $t_1$ through $t_5$ has the voltage ratios of waveform 21. A lesser degree of confidence that a detected waveform corresponds to waveform 21 is obtained where the detector merely determines that the voltage ratios of the sampled input voltage waveform are greater or smaller to some predetermined degree than the ratios of the desired waveform 21.

Since waveform detection is based upon the determination that a number of voltage ratios are satisfied simultaneously, apparatus for determining only one ratio is a basic building block and is for this reason described first. The apparatus of FIG. 3 is capable of determining not the actual voltage ratio of two voltages $V_1$ and $V_2$ but rather whether the voltage ratio $V_1/V_2$ exceeds a given value.

Figure 3:
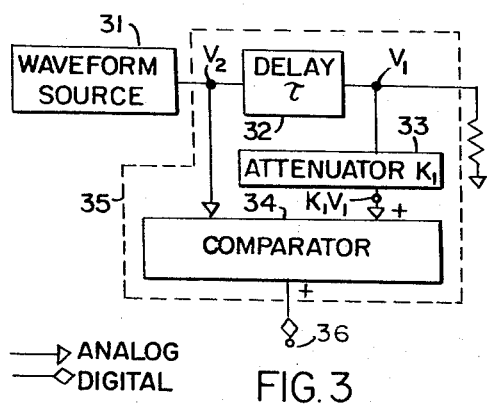
FIG. 3 shows a diagram of a fundamental voltage ratio discriminating circuit.

In many applications to waveform detection, a plurality of apparatus of the type of FIG. 3 serially connected to provide sampling of different portions of a waveform, each of which merely determines the upper (modified FIG. 3) or lower bound of a given voltage ratio, is sufficient to detect a desired waveform.

Figure 4:
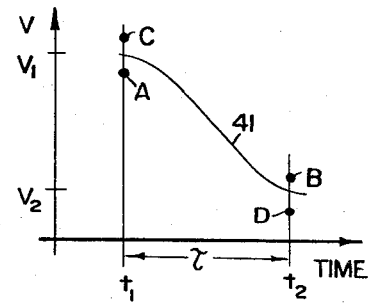
FIG. 4 illustrates the upper and lower ratio bounds imposed on a waveform by the circuits of FIG. 5.

To investigate the performance of FIG. 3, consider that waveform source 31 provides the waveform 41 of FIG. 4 to the ratio unit 35 of FIG. 3. Delay line 32 delay waveform 41 by $\tau$ seconds so that at any given time the voltages available at the input and output of delay line 32 are obtained by considering corresponding values of waveforms 41 separated by $\tau$ seconds. Attenuator 33 has an attenuation of $K_1$ which has for purposes of this explanation been arbitrarily established to be equal to $B/A$, where B and A are magnitudes as shown on FIG. 4. If waveform 41 is presented as an input to ratio unit 35, there will be a time during which the voltage $V_1$ exceeds A and voltage $V_2$ is less than B. Therefore clearly $V_1/V_2 > A/B$, so that $(B/A) \cdot V_1 > V_2$. Since the attenuation $K_1$ of FIG. 3 is set equal to the ratio of $B/A$, it is apparent that the $K_1V_1$ input to the + terminal of comparator 34, for the time sample shown in FIG. 4, is greater than the other input $V_2$. Comparator 34 is designed to have its output 36 saturate at a positive level when the voltage applied to its + terminal is more positive than the voltage at its other input terminal. A saturating differential amplifier which saturates for a small imbalance of input voltages operates satisfactorily as a comparator. It is seen that for the waveform 41 illustrated in FIG. 4, a positive output pulse will be obtained indicating the presence of a waveform satisfying the inequality $K_1V_1 > V_2$. There are many waveforms other than waveform 41 which satisfy the inequality $K_1V_1 > V_2$ and therefore produce a positive output voltage at terminal 36 of FIG. 3. It is apparent that further sampling points with additional ratio requirements are required to reduce the size of the class of waveforms that will produce an output indicative of the presence of a selected waveform.

The circuit of FIG. 3 which produces an output when $K_1V_1 > V_2$ imposes a lower bound on the $V_1/V_2$ ratio which is $V_1/V_2 > 1/K_1$. The circuit can easily be modified to produce a circuit which imposes an upper bound on the $V_1/V_2$ ratio. This can be accomplished by interchanging the connections to the input terminals of compartor 34 so that a positive output is obtained when $K_1V_1 < V_2$ or $V_1/V_2 < 1/K_1$. The inequality is satisfied if $K_1 = D/C$ for the amplitudes at time $t_1$ and $t_2$ shown for waveform 41. Alternately expressed, modified FIG. 3 will produce a positive output for all waveforms whose value at $t_1$ is less than C, and whose value at $t_2$ is more than D.

Figure 5:
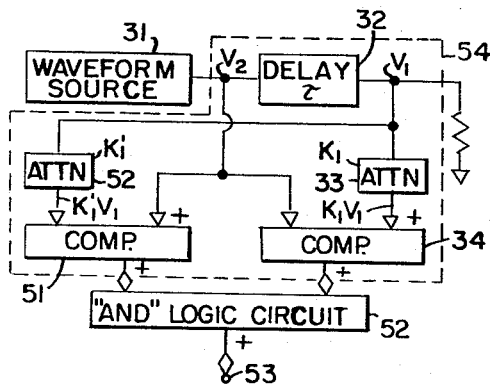
FIG. 5 shows a diagram of a circuit which provides a high and low bound on acceptable voltage ratios.

The allowable voltage ratio $V_1/V_2$ at time $t_1$ and $t_2$ of a waveform which will be accepted as a desired waveform can be considerably reduced if the lower bound on $V_1/V_2$ imposed by FIG. 3 and the upper bound on $V_1/V_2$ imposed by the circuit of FIG. 3 as modified in the preceding paragraph are caused to be applied concurrently to a waveform. The circuit of FIG. 5 shows how FIG. 3 and its modified version are combined to impose that the inequality $K_1 > V_2/V_1 > K_1'$ must be satisfied simultaneously at times $t_1$ and $t_2$ for a waveform to be detected. If $K_1 = B/A$ and $K_1' = D/C$, a waveform such as waveform 41 will produce a positive output from each of comparators 34, 51 and hence a positive output at terminal 53 of AND circuit 52 since $A < V_1 < C$ and $D < V_2 < B$ at times $t_1$ and $t_2$, respectively. Attenuators 33 and 52 are set to provide the attenuation $K_1$ and $K_1'$, respectively. Waveform 41 will not produce an output at terminal 53 if only one of the inequalities $K_1 > V_2/V_1$ or $V_2/V_1 > K_1'$ is satisfied.

As an illustration of the bounding effect of requiring that both inequalities be satisfied simultaneously by the circuit of FIG. 5, it will be assumed that $V_1 = 1$, $V_2 = 0.5$ and that $K_1 = 0.6$ and $K_1' = 0.4$. For these assumed values the bounds are $C = 1.07$, $A = 0.94$, $B = 0.56$ and $D = 0.43$. Thus any curve such as waveform 41 which has a $V_1$ value at time $t_1$ of $0.94 < V_1 < 1.07$ and a $V_2$ value at time $t_2$ of $0.43 < V_2 < 0.56$ will produce a positive output from both comparators 34 and 51 which in turn cause AND circuit 52 to provide a positive voltage level at output terminal 53. Allowing $K_1$ and $K_1'$ to approach one another will further reduce the range of voltage ratios $V_2/V_1$ at times $t_1$ and $t_2$ which the circuit of FIG. 5 will consider an acceptable waveform to be detected to produce a positive output indicative thereof at terminal 53.

It should be noted that the waveform 41 of FIG. 4 may assume innumerable forms between the sampling times $t_1$ and $t_2$ at which its voltage ratio $V_2/V_1$ must satisfy certain criteria. Hence the more closely spaced the sampling times, the more likely the waveform detected is the specific waveform which is expected. It should also be noted that the two sampling times $t_1$ and $t_2$ are effectively slid along waveform 41 by the time delay unit 32 to provide two varying voltage samples $V_2$ and $V_1$. A positive output will only be obtained at terminal 53 for those sampling times $t_1$, $t_2$ where the $V_1/V_2$ ratio requirement is satisfied.

Figure 7:
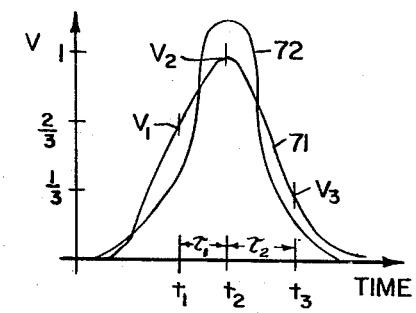
FIG. 7 illustrates typical waveforms selected by the circuit of FIG. 6.
Figure 6:
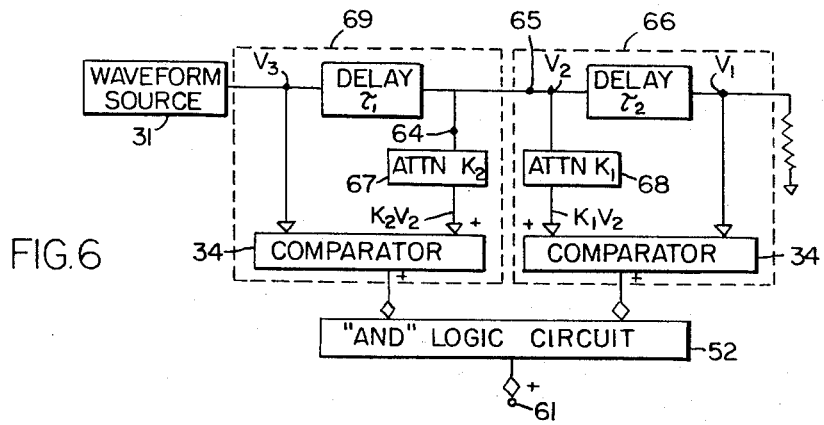
FIG. 6 shows a diagram of a circuit which has three waveform sampling points.

It is apparent that a waveform should have its voltages compared at more than two sampling points to further restrict the class of waveforms which will produce a detector output. One way that this may be done is to series connect two or more units of the type shown in FIG. 3. Such a circuit is shown in FIG. 6 where unit 69 determines that $K_2V_2 > V_3$ be satisfied and unit 66 determines that $K_1V_2 > V_1$ be satisfied in order for an output to be present at terminal 61. For the particular waveform 71 of FIG. 7 attenuations of $K_1 = \frac{2}{3}$ and $K_2 = \frac{1}{3}$ are appropriate and attenuators 67 and 68 are set to these values, respectively. Waveform 71 will just satisfy the inequalities $\frac{2}{3}V_2 > V_1$ and $\frac{1}{3}V_2 > V_1$ at the instant shown in FIG. 7 but at no other time. For this reason, if waveform 71 is the waveform desired to be detected, $K_1$ and $K_2$ would be set slightly higher than $\frac{1}{3}$ and $\frac{2}{3}$, respectively, whereby the inequality conditions would be satisfied where waveform 71 is displaced slightly to the right and left of the position shown in FIG. 7. However, any waveform such as waveform 72 which has a $V_2/V_1$ and $V_2/V_3$ ratio greater than that of waveform 71 will also produce a positive output at terminal 61 and for a substantially long time. Conversion of each of units 69 and 66 to provide the maximum-minimum voltage ratio capacity of FIG. 5 will further restrict the maximum value of waveform 72 at time $t_2$ and the minimum value at times $t_1$ and $t_3$.

It is seen that a variation of FIG. 6 can select the same waveform if terminal 64 of attenuator 67 is instead connected to the $V_1$ terminal rather than the $V_2$ terminal 65 and if the attenuation $K_2$ value of $\frac{1}{3}$ is changed to $\frac{1}{2}$.

It is observed that the delay provided by delay lines $\tau_1$ and $\tau_2$ of FIG. 6 is such that the total delay $\tau_1 + \tau_2$ extends substantially over the portion of interest of the waveform 71 to be selected while the individual delays $\tau_1$, $\tau_2$ should cause the sampling points $t_1$, $t_2$, $t_3$ to occur near a change in slope of the waveform if present. In practice, delay lines chosen for a selected waveform may be used for other waveforms of comparable duration with the attenuation of $K_1$, $(K_1')$, $K_2$ and $(K_2')$ adjusted to suit the other waveforms at times $t_1$, $t_2$ and $t_3$.

The extension of FIG. 6 to include more cascaded units of the type 35, 54, 66 or 69 to improve the waveform selectively is apparent. However, FIG. 8, which has three serially connected delay lines to provide for sampling times, is included to illustrate the situation that isolated portions of a waveform may individually satisfy the voltage ratio requirements without the whole waveform being of the type desired to be selected; and therefore, the necessity for establishing a ratio relationship between adjacent sampling points.

Figure 8:
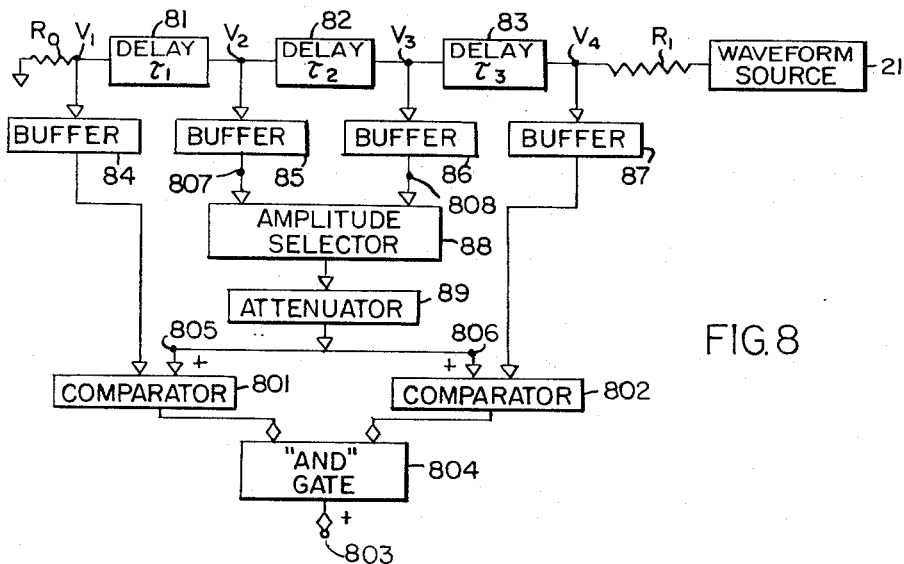
FIG. 8 shows a diagram of a circuit which selects the smaller of two sampled voltages before determining ratios.
Figure 9:
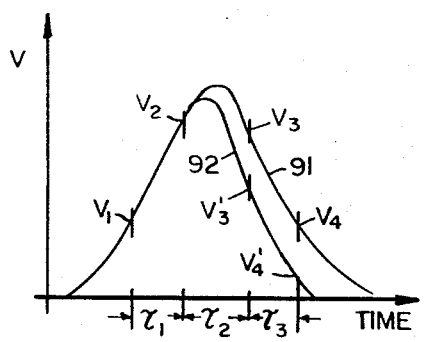
FIG. 9 shows waveforms between which the circuit of FIG. 8 can discriminate in detecting.

Waveform 91 of FIG. 9 is the waveform which is desired to be selected by the circuit of FIG. 8. Waveform 91 is a symmetrical pulse whose amplitudes $V_2$, $V_3$ are twice $V_1$, $V_4$ for the time separations $\tau_1$, $\tau_2$, $\tau_3$ and instant of sampling shown in FIG. 9. Waveform source 21 of FIG. 8 provides waveform 91 to the serial connection of delay lines 81, 82 and 83 which are terminated by resistors $R_0$ and $R_1$ to minimize reflections. Signal amplitudes $V_1$, $V_2$, $V_3$ and $V_4$ of waveform 91 are available as the inputs to buffer amplifiers 84, 85, 86 and 87. The buffer amplifiers may be transistor emitter followers with less than unity gain. Buffers 85 and 86 have their outputs connected to an amplitude selector 88 which provides at its output the least positive of positive signals $V_2$ and $V_3$. This least positive signal is then attenuated by ½ in attenuator 89 before providing an input to each of comparators 801 and 802. If $½(V_2 \text{ or } V_3) > V_1$ and $$½(V_2 \text{ or } V_3) > V_4$$

a positive output voltage at terminal 803 will be obtained from AND logic circuit 804, as explained earlier. Selector 88 may be a simple emitter follower circuit with two p-n-p transistors' emitters connected to a common emitter resistor and bases connected to terminals 807, 808, whereby the most positive base causes that transistor to be cut off.

Amplitude selector 88 has as its purpose the prevention of a waveform such as 92 of FIG. 9 from being considered a desired waveform. If amplitude selector 88 were not used and instead each buffer 85 and 86 provided its output through separate attenuators of ½ (not shown) to terminals 805 and 806, respectively, of comparators 801, 802, the conditions of $½V_2 > V_1$ and $½V_3 > V_4$ are independently satisfied for the unsymmetrical waveform 72 and produces an output pulse. Thus any independence which exists between the sampled points of a waveform whose ratios individually satisfy simultaneously their inequalities must be eliminated if the output indication at terminal 803 is to have more significance as to the type of waveform at the input of the detector. One way of providing a link or coupling between two inequality ratios is through amplitude selector 88. It is seen that the output of selector 88 is $V_3'$ in the case where the input is waveform 92. Obviously, $½V_3'$ is not greater than $V_1$, hence the output comparator 801 is negative and there is no output at terminal 803 for undesired waveform 72.

Figure 10:
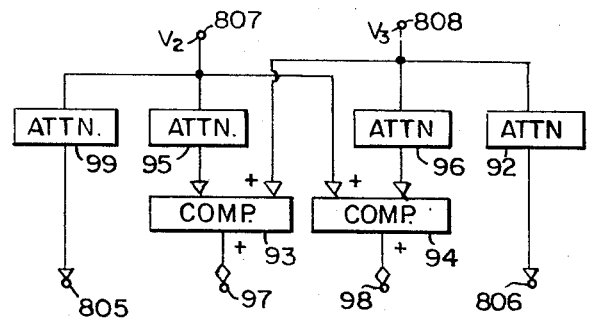
FIG. 10 shows an alternate arrangement for a portion of FIG. 8.

An alternate circuit for providing the link between the two inequalities is to substitute the circuit of FIG. 10 for the selector 88 and attenuator 89 of FIG. 8. Output terminals 807, 808 of buffers 85, 86 are connected through attenuators 99, 92 (attenuation of ½) to terminals 805, 806 of comparators 801, 802 to determine if waveform 71 satisfies, as before, the inequalities that $½V_2 > V_1$ and $½V_3 > V_4$. In addition, $V_3$ and $V_4$ are compared in comparators 93 and 94 after each is slightly attenuated in attenuators 95, 96. Attenuators 95, 96 transmit 0.9 of their input. Then if $0.9V_3 < V_4$ and if $0.9V_4 < V_3$ are both satisfied, a positive output at terminals 97 and 98 is provided as additional inputs to AND circuit 804 of FIG. 8. When all inputs to AND 804 are positive it is clear that the input is waveform 71 rather than waveform 72. The transmission factor of 0.9 for attenuators 95, 96 is a matter of choice; the nearer unity, the more symmetrical must waveform 71 be to satisfy simultaneously the inequality.

A link between the many possible ratio comparisons available in a circuit having many sampling points is necessary in order to avoid the undesirable situation illustrated by curves 91 and 92. One way of achieving the link is best described by referring to the waveform of FIG. 11 which is illustrative of a complex waveform which the detector of this invention is capable of detecting. Waveform 111 is of known form and has values $V_1$ through $V_6$ at times $t_1$ through $t_6$, where the spacing between $t_1, t_2 \ldots t_6$ is determined by delay lines $\tau_1 \ldots \tau_5$. It is assumed for the purpose of this discussion that the amplitude of waveform 111 is fixed and therefore $V_1$ through $V_6$ have fixed magnitudes. Values of numerical quantities $K_1$ through $K_6$ are chosen so that they alternate above and below the corresponding values $V_1$ through $V_6$. Thus $K_1 > V_1$, $K_2 < V_2$, etc. The values of K are used in determining the values of the attenuation to be applied to certain voltage samples. If these attenuation values are properly determined, a detector such as in FIG. 12 can be constructed which imposes the restriction on a waveform such as 111 that it must be below values $K_1$, $K_3$, $K_5$, and above values $K_2$, $K_4$, $K_6$ in order to be detected.

Figure 11:
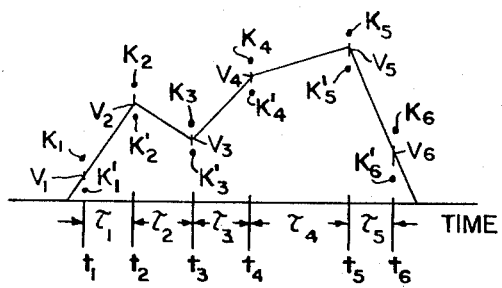
FIG. 11 illustrates a complex waveform which the circuit of FIG. 12 can detect.

Restricting attention for the moment to $V_1$ and $V_2$ of FIG. 11, it is seen that a positive output from comparator 121 is obtained if attenuation 122 has a transmission $K_{12} = K_1/K_2$ since obviously $(K_1/K_2)V_2 > V_1$ for the values of $K_1$ and $K_2$ as shown on FIG. 11. This condition will exist for all ratios $V_2/V_1 > K_2/K_1$. Similarly the other attenuations are $K_{23} = K_3/K_2$, $K_{34} = K_3/K_4$, $K_{45} = K_4/K_5$, and $K_{56} = K_6/K_5$. If these values of attenuation are used in the circuit of FIG. 12, a positive output at terminal 123 will be obtained when waveform 111 of FIG. 11 is presented as an input. It is seen that any waveform whose voltage values are below $K_1$, $K_3$ and $K_5$ and above $K_2$, $K_4$ and $K_6$ at times $t_1, t_2 \ldots t_6$ is also detected as an acceptable waveform. However, it is apparent that the requirement that the waveform alternate is going above and then going below adjacent sampling values $K_1$, $K_2$ etc. has effectively linked all the individual ratio tests. If for some reason, the choice of $K_1$, $K_2$ etc. is such that the desired waveform is above or below two adjacent sampling points, the selection circuit of FIG. 8 or its equivalent must be used to provide the linking of the ratios on both sides of the adjacent sampling points.

Figure 12:
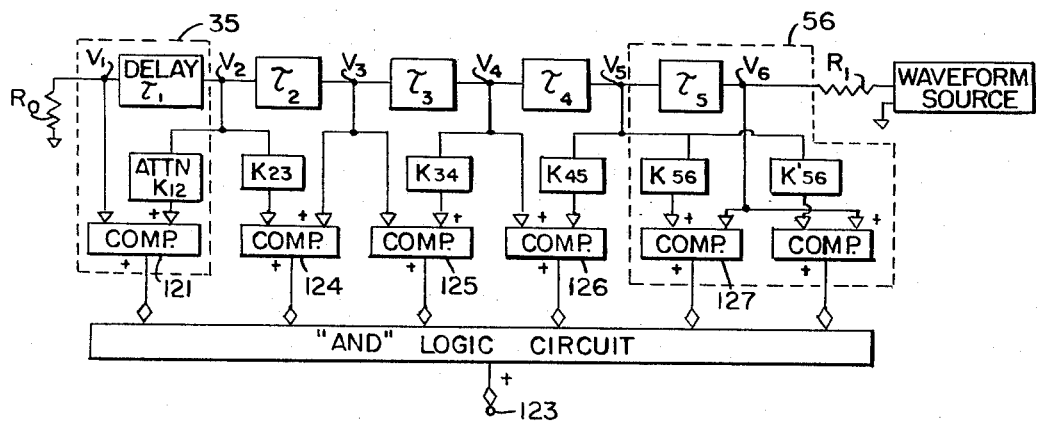
FIG. 12 shows a circuit which can detect the waveform of FIG. 11.

Restriction in the excursions of the waveform below $K_1$, $K_3$ and $K_5$ and above $K_2$, $K_4$ and $K_6$ is accomplished by replacing the "one-bound" ratio unit 35 of FIG. 3 by the "two-bound" ratio unit 56 of FIG. 5 in the detector of FIG. 12. A typical unit 56 is shown in FIG. 12. Referring to FIG. 11 it is seen that additional restrictions on the amplitude of the waveform at times $t_1$ through $t_6$ have been established as $K_1'$, $K_2' \ldots K_6'$. Ratio unit 56 now has two attenuators $K_{56}$ and $K_{56}'$ which are connected to their respective comparators as in FIG. 5. The value of $K_{56}$ is as before equal to $K_6/K_5$ while $K_{56}' = K_6'/K_5'$. As seen earlier in in the discussion of FIG. 5 the allowable ratios of $V_6/V_5$ are given by $K_6'/K_5' < V_6/V_5 < K_6/K_5$.

While FIG. 12 shows a diagram of one detector capable of detecting the waveform 111, it is possible to have the comparator circuits of FIG. 12 connected to other than opposite ends of a given delay line $\tau_1$, $\tau_2$, etc. Comparators 121, 124, 125, 126 and 127 effectuate the following inequalities $$(K_1/K_2)V_2 > V_1, \ (K_3/K_2)V_2 > V_3, \ (K_3/K_4)V_4 > V_3$$

$(K_4/K_5)V_5 > V_4$ and $(K_6/K_5) < V_6$, respectively. There are four other inequalities which may be written by inspection of FIG. 11. These are $(K_1/K_4)V_4 > V_1$, $(K_6/K_1)V_1 < V_6$, $(K_2/K_5)V_5 < V_2$ and $(K_6/V_3)V_3 > V_6$. Comparator circuits effectuating any of the last four inequalities may be substituted for the comparators of FIG. 11 with two conditions: 1. There must be at least five comparators (one less than the number of sampling points) and every sampling point must be linked through one or more comparators to every other sampling point. As an example of a comparator connection for $$(K_1/K_4)V_4 > V_1$$

an attenuator would have an attenuation of $K_1/K_4$ can be connected to $V_4$ terminal. The other end of the attenuator would be connected to the + terminal of a comparator. The remaining terminal of the comparator is connected to $V_1$. According to the rule established, either attenuator $K_{12}$ and its associated comparator 121 or attenuator $K_{34}$ and its associated comparator can be removed.

A situation which must be considered is the operation of the waveform detector circuits with noise voltages at their inputs. Since it has been emphasized that the detectors are designed to detect ratios of voltages at specified times and not their magnitudes, ideally in the absence of noise, the waveform detectors would function down to signal levels limited primarily by the differential amplifier comparators minimum reliable switching input levels. Since the input noise level is normally above the reliable switching level, the presence of input noise will occasionally cause an output from the detector even in the absence of a desired waveform. The simplest way of eliminating the noise problem is to adjust the balance control of the differential amplifier comparator until with only noise at the input and no desired waveform present, there are no positive excursions of the differential amplifier which could be interpreted as a desired waveform signal presence. If this adjustment is made to every comparator, there will be no output from the detector from noise alone. In the absence of a balancing potentiometer, a negative bias on the terminal marked + of the comparator or a positive bias on the unmarked terminal will provide the same result. Preferably there should be no direct voltage component on the waveform provided by source 31.

It should be noted that the presence of bias to overcome noise is a fixed direct voltage level which does not change with input signal level. Therefore, the ratio of the two voltages applied to the comparator is not exactly independent of the input waveform amplitude. If the bias is small compared to the operating range of input voltages, no serious change in ratios occurs. If the signal amplitude range is only several times bias there will be a substantial change in ratios which requires that the selection of attenuation values accommodate these ratios.

An alternative to the serial connection of delay lines of FIGS. 6, 8 and 12 is a quantity of parallel delay lines all of whose inputs are connected to waveform source 31. Their outputs are connected through buffers, if desired, to comparators with or without attenuation according to the ratio inequality to be satisfied. As an illustration of a parallel connection of delay lines, FIG. 6 can be so modified by disconnecting delay $\tau_2$ at terminal 65 and connecting instead to waveform source 31. In addition, delay $\tau_2$ must be increased to $\tau_1+\tau_2$. The parallel connection of delay lines has the advantage of reducing the reflection problem present at the junction of the serially connected delay lines.

The invention has been described in terms of apparatus where all comparator outputs must be positive to cause a subsequent logical AND circuit to produce an output pulse indicative of the presence at the input of the detector of a desired waveform. It is seen that where many sampling points are used, where there is noise superimposed on the signal and where the tolerance of allowable voltage ratios is small, there is a possibility that a few of the voltage amplitude ratios tested will not satisfy the criteria established for the desired waveform even though the input waveform is actually the desired waveform. In this event, the apparatus should be capable of indicating that the desired waveform has nonetheless been received. To illustrate such a capability consider a detector with only three comparators. The three comparators taken two at a time have their outputs connected to three AND circuits which in turn have their outputs connected as inputs to a logical OR circuit. For the situation where one comparator has a negative output because the sampled voltages have not satisfied the ratio requirement because of noise or other perturbation, the detector will still produce an output if the other two ratios are satisfied. The extension of this concept to many more comparators is apparent.

It is understood that though the invention has been described for a time varying voltage which required the use of delay lines or some equivalent circuitry to provide a space variable voltage, the invention has application to situations where independent sources are simultaneously providing constant or time varying voltage $V_1$, $V_2$, etc. directly to the terminals so designated in the figures where it is understood the delay lines have been removed. It is also understood that though a detector circuit is designed specifically to detect a selected waveform and its related waveforms, it will also produce an output for any waveform which satisfies the voltage ratio requirements at the selected sampling points.

It is apparent that those skilled in the art may make numerous departures from and modifications of the specific apparatus described herein without departing from the inventive concepts. Consequently, the invention is to be construed as limited only by the spirit and scope of the appended claims.

I claim:

1. An electrical waveform detection apparatus comprising, means for providing said waveform and a time-delayed said waveform, means for attenuating either waveform amplitude to provide a fractional amplitude waveform, means for comparing the instantaneous amplitudes of said attenuated waveform and the other waveform, said comparison means having an output voltage of one polarity when the attenuated waveform amplitude exceeds the amplitude of the other waveform and a second polarity when this condition is not satisfied, whereby an output voltage of said one polarity determines that the ratio of the instantaneous amplitude of the other waveform to the instantaneous amplitude of the attenuated waveform before attenuation is less than said fraction and an output voltage of said second polarity where greater than said fraction.

2. A waveform detector for determining whether the ratio of the instantaneous amplitude of a waveform at one time to the instantaneous amplitude at a different time exceeds a predetermined fraction comprising, means for providing said waveform and said waveform delayed in time, means for attenuating either waveform amplitude to provide a fractional amplitude waveform, said fraction being equal to said predetermined fraction, means for comparing the amplitude of said fractional amplitude waveform with the amplitude of the other waveform, said comparison means having an output voltage of one polarity where the other waveform amplitude exceeds the fractional amplitude waveform and an output voltage of a second polarity where the other waveform amplitude is less than the fractional amplitude waveform, whereby an output voltage of said one polarity determines that the ratio of the instantaneous amplitude of said other waveform to the instantaneous voltage of said waveform before attenuation exceeds said predetermined fraction, and an output voltage of said second polarity determines that said ratio is less than said predetermined fraction.

3. Apparatus responsive to selected electrical waveforms characterized by their voltage amplitudes at predetermined positions along the waveform satisfying certain ratio requirements established by said apparatus comprising, a source of waveforms including said selected waveforms, means for providing a plurality of said waveforms delayed in time and each differing in delay one from another to provide the instantaneous value of a waveform at these delay times to be available concurrently, means for providing a plurality of different pairs of said plurality of voltage waveforms to provide a first and second voltage in each pair, means for attenuating the first voltage in each pair to a fraction of said first voltage, said fraction being independent of the fractional value of attenuation of any other pair of voltages, a plurality of first comparison means for comparing said pairs of voltages, said attenuated first voltage and said second voltage of a pair being connected to the inputs of a first comparison means to provide an output of one polarity when the voltage applied to a particular input terminal of said comparison means exceeds the voltage at the other input terminal of said comparison means and of a second polarity when this condition is not satisfied, a second comparison means having a plurality of inputs each of which are connected to the output of a different one of said plurality of first comparison means, said second comparison means having an output of one polarity when the output of each first comparison means has an output of one polarity and an output of a second polarity when the output of any first comparison means is of a second polarity.

4. Apparatus for detecting a waveform having a prescribed amplitude at certain time intervals during its duration comprising, a source of electrical waveforms, a delay line connected to said source, said delay line having a plurality of output taps providing different delays, each tap providing a time-varying voltage corresponding to the delayed waveform, any two taps providing a pair of first and second voltages, a plurality of pairs of first and second voltages, means for attenuating said first voltage of each pair to a fraction thereof, said fraction being independent of the fractional value of attenuation of the first voltage of any other pair of voltages, a first means for comparing the amplitude of said attenuated first voltage and the said second voltage of each pair, a first and second plurality of said first comparison means, each comparison means of said first plurality having a first polarity of output when the attenuated first voltage is greater than the second voltage and a second polarity of output when the attenuated first voltage is less than the second voltage, each comparison means of said second plurality having a first polarity of output when the attenuated first voltage is less than the second voltage and a second polarity when the attenuated first voltage is greater than the second voltage, a second comparison means having its inputs connected to the outputs of each first comparison means to provide a first polarity at its output when all first comparison means have a first polarity of output and a second polarity at its output when any one of said first comparison means has a second polarity of output, whereby a first polarity of output from said second comparison means is indicative of the detection of a waveform whose instantaneous voltages at points separated in time by the delay time between the taps of the delay line simultaneously satisfy the ratio requirements imposed by the attenuating means of each pair of selected instantaneous voltages.

References Cited
UNITED STATES PATENTS

| | | | |
|---|---|---|---|
| 2,611,861 | 9/1952 | Heath | 328—135 |
| 3,095,541 | 6/1963 | Ashcraft. | |
| 3,111,645 | 11/1963 | Milford | 328—135 X |
| 3,114,884 | 12/1963 | Jakowatz | 328—135 X |
| 3,178,582 | 4/1965 | Crane | 324—77 X |
| 3,214,699 | 10/1965 | Jakowatz | 328—135 X |

WALTER L. CARLSON, *Primary Examiner.*

P. F. WILLE, *Assistant Examiner.*